(12) United States Patent
Majerik

(10) Patent No.: US 10,167,956 B2
(45) Date of Patent: Jan. 1, 2019

(54) PURGEABLE LABYRINTH AXLE/HUB SEAL

(71) Applicant: Frank Majerik, Empire, AL (US)

(72) Inventor: Frank Majerik, Empire, AL (US)

(*) Notice: Subject to any disclaimer, the term of this patent is extended or adjusted under 35 U.S.C. 154(b) by 306 days.

(21) Appl. No.: 15/201,471

(22) Filed: Jul. 3, 2016

(65) Prior Publication Data
US 2016/0312900 A1    Oct. 27, 2016

Related U.S. Application Data

(62) Division of application No. 14/201,516, filed on Mar. 7, 2014, now Pat. No. 9,435,436.

(60) Provisional application No. 61/799,947, filed on Mar. 15, 2013.

(51) Int. Cl.
| | |
|---|---|
| *F16J 15/44* | (2006.01) |
| *F16J 15/40* | (2006.01) |
| *B60B 27/00* | (2006.01) |
| *B60B 35/02* | (2006.01) |
| *B60B 35/12* | (2006.01) |
| *F16C 33/80* | (2006.01) |
| *F16J 15/447* | (2006.01) |
| *B60B 35/16* | (2006.01) |

(52) U.S. Cl.
CPC ....... *F16J 15/4476* (2013.01); *B60B 27/0073* (2013.01); *B60B 35/02* (2013.01); *B60B 35/12* (2013.01); *F16C 33/80* (2013.01); *F16J 15/4478* (2013.01); *B60B 35/16* (2013.01); *F16J 15/40* (2013.01)

(58) Field of Classification Search
CPC ........ F16J 15/40; F16J 15/447; F16J 15/4472; F16J 15/4476; F16J 15/4478; F16C 33/80; F16C 33/805; F16C 2326/02; B60B 27/0073
See application file for complete search history.

(56) References Cited

U.S. PATENT DOCUMENTS

| | | | | |
|---|---|---|---|---|
| 2,312,361 | A * | 3/1943 | Sanford | B60B 37/10 |
| | | | | 295/44 |
| 2,387,301 | A * | 10/1945 | Sanford | F16J 15/20 |
| | | | | 277/587 |
| 3,042,417 | A | 7/1962 | Derman et al. | |
| 3,938,864 | A | 2/1976 | Haussels | |
| 4,199,052 | A | 4/1980 | Morris | |
| 4,799,808 | A | 1/1989 | Otto | |
| 5,085,443 | A | 2/1992 | Richards | |
| 6,471,215 | B1 | 10/2002 | Drago et al. | |
| 6,588,564 | B1 | 7/2003 | Jaeger et al. | |
| 9,435,436 | B2 * | 9/2016 | Majerik | F16J 15/4478 |
| 2004/0258337 | A1 * | 12/2004 | Norimatsu | F16C 19/386 |
| | | | | 384/448 |
| 2006/0165331 | A1 * | 7/2006 | Sakamoto | B60B 27/00 |
| | | | | 384/544 |
| 2007/0253653 | A1 | 11/2007 | Shigeoka et al. | |
| 2008/0159673 | A1 * | 7/2008 | Muranaka | B60B 27/001 |
| | | | | 384/448 |

(Continued)

*Primary Examiner* — Nicholas L Foster
(74) *Attorney, Agent, or Firm* — Baker Donelson

(57) ABSTRACT

A purgeable labyrinth axle/hub seal for a motor vehicle with an axle annular member that attaches to an end portion of an axle and a hub annular member that attaches to a wheel hub and matingly connect for defining a cavity that receives grease and a labyrinth gallery for a grease path from the cavity, to seal the connection of the axle and hub from water, dirt and other contaminants.

24 Claims, 15 Drawing Sheets

(56) References Cited

U.S. PATENT DOCUMENTS

2014/0239597 A1  8/2014  White et al.
2014/0265147 A1* 9/2014  Majerik ............... F16J 15/4478
                                                    277/412

* cited by examiner

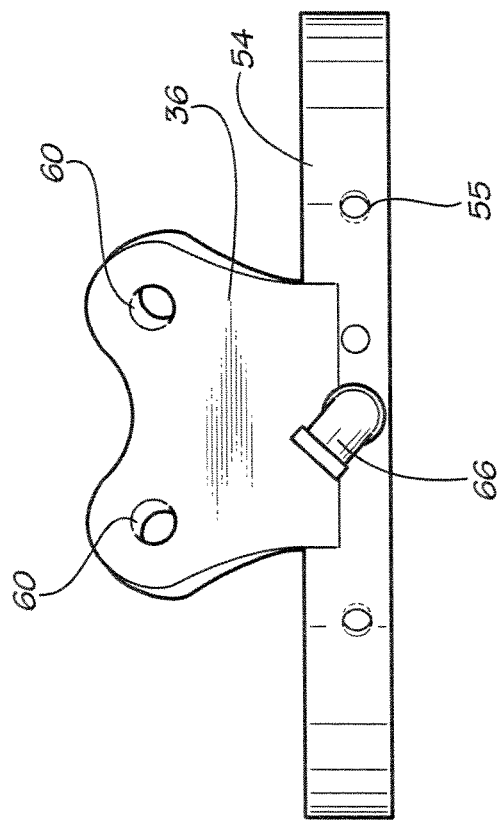
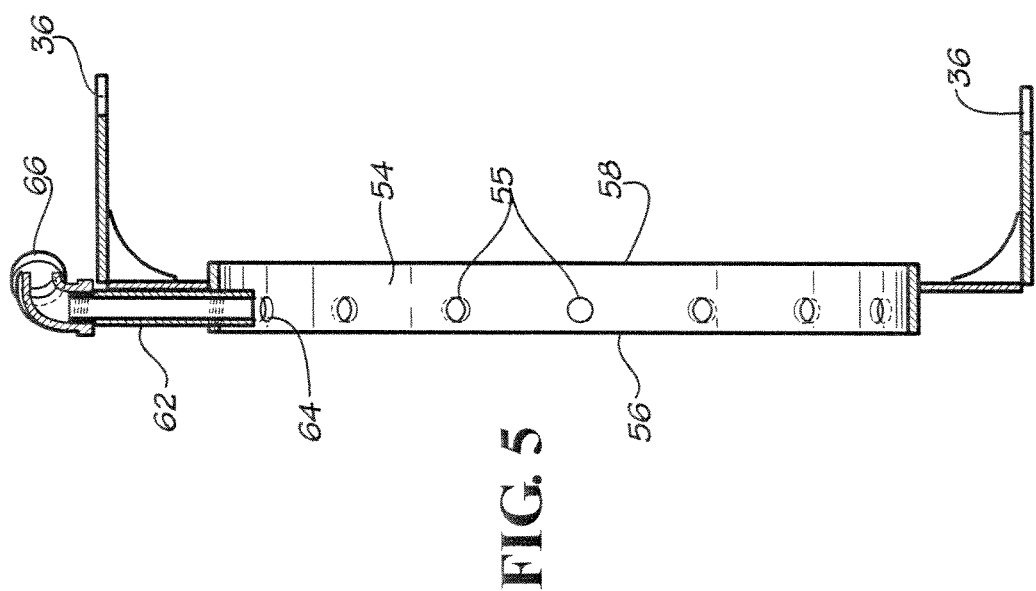
FIG. 6
FIG. 5

PURGEABLE LABYRINTH AXLE/HUB SEAL

TECHNICAL FIELD

The present invention relates to seals for axles and rotatable hubs for wheeled vehicles. More particularly, the present invention relates to a purgeable labyrinth seal for wheeled vehicles having axles and rotatable hubs in sealed relation for use in severe environments to reduce damage to the connection of the axle and hub arising from seal failure.

BACKGROUND OF THE INVENTION

Axles have long been used for wheeled vehicles, in which the axle being placed cross wise of a longitudinal axis and carrying on its outer ends wheels attached through hubs to the axle on which the vehicle is rolled. Generally a front axle is used for guiding the motor vehicle. The front axles are generally used solely for guiding but sometimes also for propelling. A rear axle generally is a driving axle, but in the instance of a front wheel drive axle, the rear axle provides for rear wheels that follow the driving wheels of the front axle. Front axles use conventional steering assemblies in which road wheels are mounted on steering-pivots or knuckles carried on the outer end of the axle. Other types of steering may be used, for example slow-moving vehicles such as farm tractors, road rollers and traction engines.

The hub rotatingly mounts to the end of the axle. The hub is either driven, such as rear wheel drive axles, or dead (i.e., non-driven, but rotatingly following the driven wheels.) The connection of the hub to the axle is protected by a seal. The seal defines a cavity which typically is filled with oil or grease to provide a barrier to entry of contaminants and to provide lubrication of the moving parts during operation of the motor vehicle.

While sealed axle/hubs have been used successfully, severe operating conditions may lead to seal failure. Upon failure of the seal, the lubricating material leaks from the seal. The leakage creates openings for entry of destructive debris. Equipment used in severe conditions such as mining, earth moving, construction, farming, and the like often include water and dirt mixtures. Clay, shell rock, and gravel create dust, dirt and grit. Water, dirt, sulfurous materials and the like entering the seal causes damage to the rotating parts. Low places in mines typically are filled with gravel. Pools of water stand in passageways of mines. The axles get coated with the mixture which dries and becomes a crust. The watery mixture also may enter the seals into the axle. The mixture wears out bearings. Persons engaged in operating heavy duty equipment industry in severe environments have sought to prevent hub seals from leaking.

Accordingly, there is a need in the art for an improved axle/hub seal. It is to such that the present invention is directed.

BRIEF SUMMARY OF THE INVENTION

The present invention meets the need in the art by providing a purgeable labyrinth axle/hub seal, comprising an axle annular member held by an axle mount and a hub annular member held by a hub mount, which axle annular member and hub annular member matingly engage to define the seal. More particularly, the purgeable labyrinth axle/hub seal comprises an axle mount for rigidly attaching to an end portion of an axle with an axle annular member extending therefrom. The axle annular member comprises an axle ring having a first edge and a second edge and an axle flange disk attached to an outer surface of the ring intermediate the first edge and the second edge and extending therefrom to a distal edge. The purgable labyrinth axle/hub seal includes a hub mount for rigidly attaching to a wheel hub with a hub annular member extending therefrom. The hub annular member comprises a hub ring having a first edge and a second edge, and a hub flange disk attached to an outer surface of the hub ring intermediate the first edge and the second edge and extending therefrom to a distal edge. The axle annular member matingly engages the hub annular member and cooperatively define a labyrinth gallery therebetween. A grease fitting communicates a lubricant into the grease gallery. Lubricant communicates through the labyrinth gallery outwardly of the seal during rotation of the hub relative to the steering axle. A seal member disposed between the axle annular member and the hub annular member cooperatively defines a labyrinth path that communicates with the lubricant gallery.

In another aspect, the present invention provides a purgeable labyrinth axle/hub seal comprising a first annular member and a second opposing annual member. Each annular member comprises a ring having a first edge and a second edge and a flange disk attached to an outer surface of the ring intermediate the first edge and the second edge and extending therefrom to a distal edge. The first annular member further comprises a means for attaching the first annular member to an end of an axle. The second annular member further comprises means for attaching the second annular member to a hub in facing relation to the first annular member to define a lubricant gallery. A seal member disposed between the first and second annular members cooperatively defines a labyrinth lubricant path from the lubricant gallery. A fitting communicates a lubricant into the lubricant gallery. Lubricant communicates through the labyrinth path outwardly of the seal when the hub rotates relative to the axle.

Objects, advantages, and the features of the present invention will become apparent upon a reading of the following detailed description in conjunction with the drawings and the appended claims.

BRIEF DESCRIPTION OF THE DRAWINGS

FIG. 5 illustrates in cross-sectional view the axle connector assembly shown in FIG. 4.

FIG. 6 illustrates a top plan view of the axle connector assembly shown in FIG. 4.

DETAILED DESCRIPTION

Figure 1:
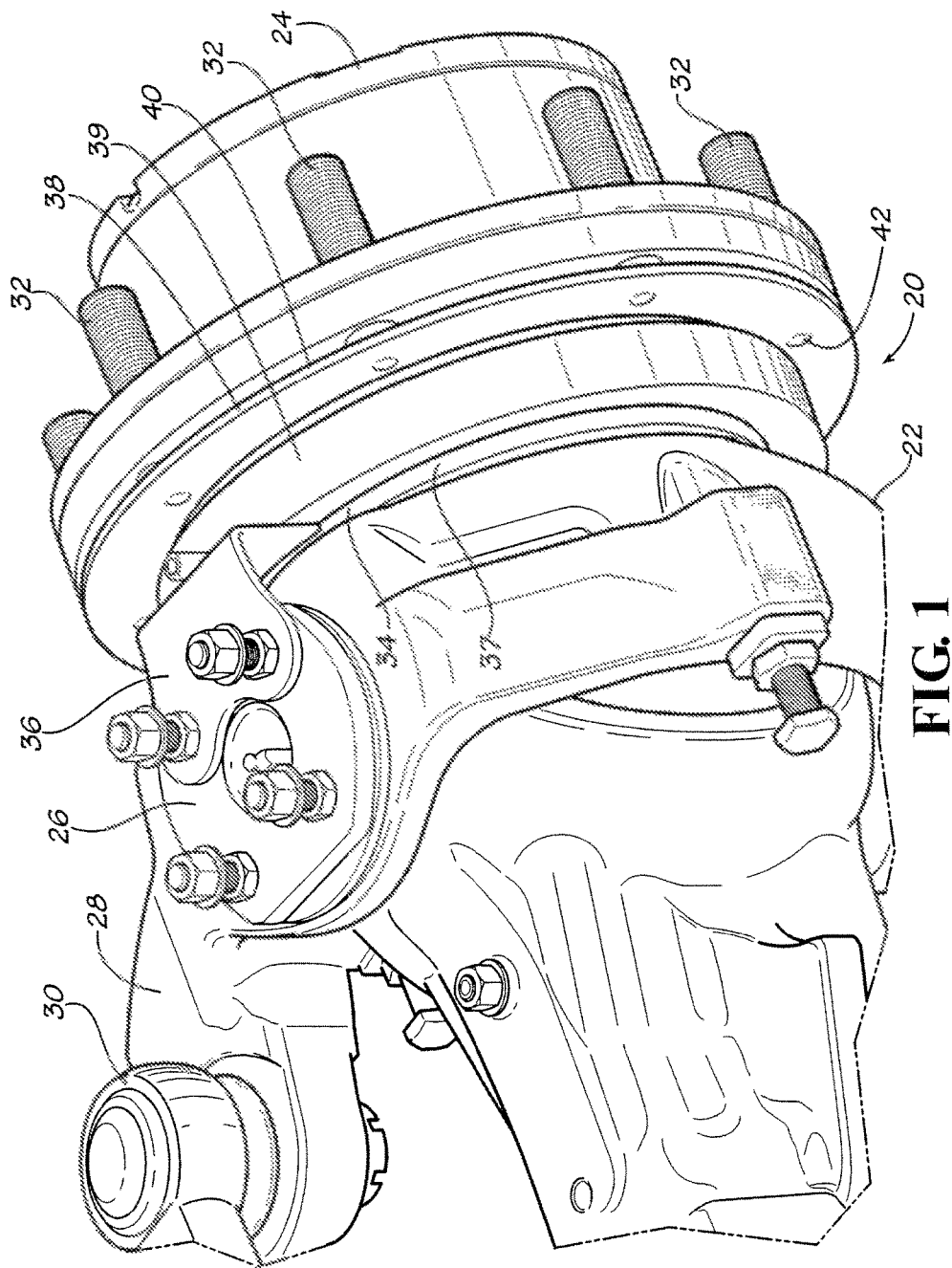
FIG. 1 illustrates in perspective view a steering axle and hub having an embodiment of the purgeable labyrinth seal according to the present invention.

With reference to the drawings in which like parts have like reference numerals, FIG. 1 illustrates in perspective view a first exemplary embodiment of a purgeable labyrinth seal 20 in accordance with the present invention. The purgeable labyrinth seal 20 attaches between a steering axle 22 and a rotatable hub 24 for a wheel. The steering axle 22 includes opposing upper and lower kingpins 26 (lower kingpin not illustrated) and a steer shoulder 28 with tie rod 30. The hub 24 includes a plurality of threaded studs 32. The threaded studs 32 extend through openings in a vehicle wheel (not illustrated) and receive nuts for securing the wheel to the hub 24.

The labyrinth seal 20 of the present invention comprises a steering axle connector assembly 34 and a steering axle hub assembly 38. The steering axle connector assembly 34 attaches with flange plates 36 to the kingpins 26. A connector seal member 37 extends from the steering axle connector assembly 34. The steering axle hub assembly 38 comprises an attaching plate 40 and a hub seal member 39 that extends from the steering axle hub assembly 38. The attaching plate 40 defines a plurality of openings 42. Fasteners extend through the openings 42 to attach the steering axle hub assembly to the hub 24, as discussed below. The axle seal member 37 and the hub seal member 39 matingly engage to define a grease galley therebetween (discussed below) for the labyrinth seal 20 for sealing the steering axle-hub joint.

Figure 2:
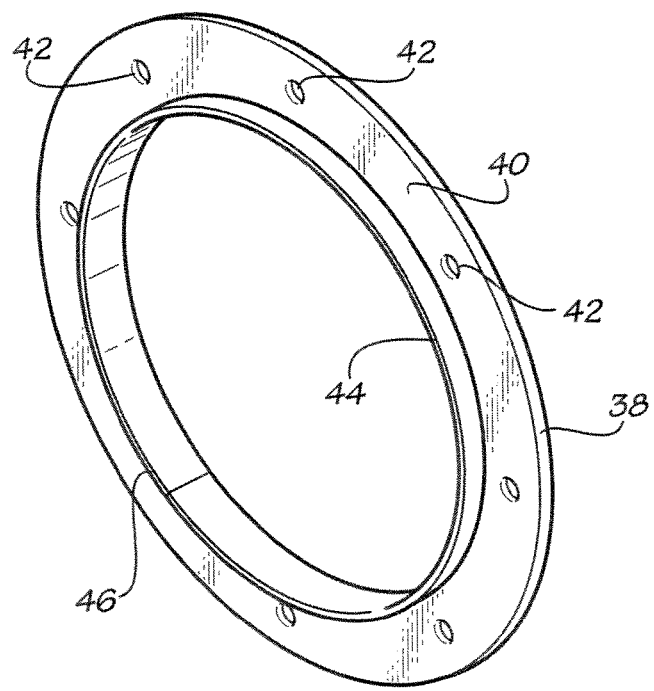
FIG. 2 illustrates in perspective view an axle hub assembly for the purgeable labyrinth seal illustrated in FIG. 1.
Figure 3:
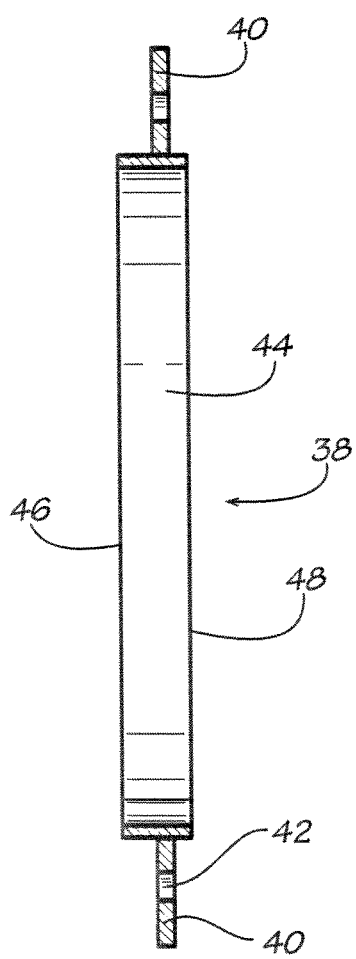
FIG. 3 illustrates in cross-sectional view the axle hub assembly shown in FIG. 2.

FIG. 2 illustrates in perspective view the steering axle hub assembly 38 for the purgeable labyrinth seal 20 illustrated in FIG. 1. FIG. 3 illustrates the steering axle hub assembly 38 in cross-sectional view. The steering axle hub assembly 38 comprises a flange plate 40 and a cylindrical ring 44. The circularity of the ring 44 must be maintained in order for the purgable seal 20 to operate properly. The flange plate 40 defines a plurality of spaced-apart openings 42. The ring 44 has a first edge 46 and opposing second edge 48. The flange plate 40 attaches to the ring 44 intermediate the first and second edges 46, 48.

Figure 4:
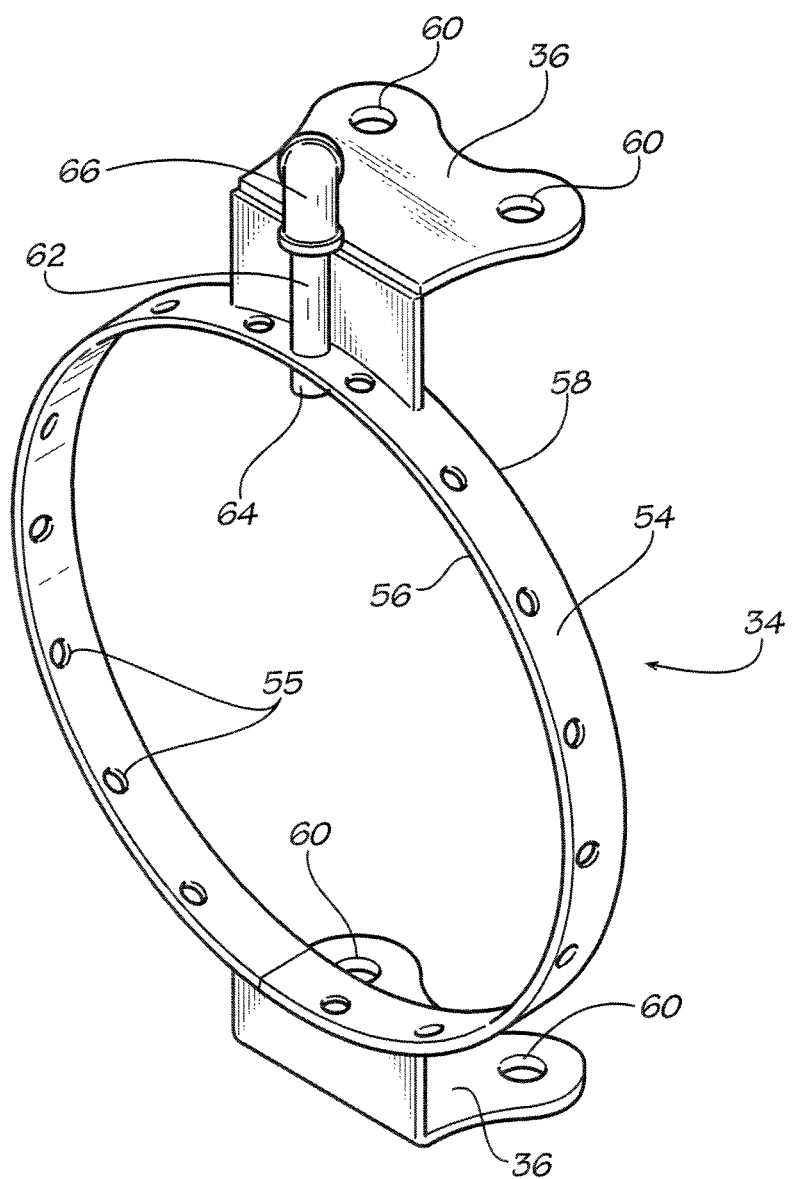
FIG. 4 illustrates in perspective view an axle connector assembly for the purgeable labyrinth seal illustrated in FIG. 1.

FIG. 4 illustrates in perspective view the steering axle connector assembly 34 for the purgeable labyrinth seal 20 illustrated in FIG. 1. FIG. 5 illustrates the axle connector assembly 34 in cross-sectional view and FIG. 6 illustrates the axle connector assembly in top plan view. With reference to FIGS. 4-6, the steering axle connector assembly 34 comprises a cylindrical ring 54. The ring 54 defines a plurality of openings 55. The ring 54 has a first edge 56 and an opposing second edge 58. The pair of opposing flange plates 36 attach to opposing portions of the ring 44 intermediate the first edge 56 and the second edge 58. The flange plates 36 are L-shaped in cross-sectional view and may include gussets for rigidity. A pair of openings 60 are defined in each of the flange plates 36 for receiving a respective bolt extending from the kingpins 26 of the steering axle 22.

As best illustrated in FIG. 5, a grease tube 62 attaches to one of the flange plates 36 and extends through the ring 54 and terminates with an open end 64. An opposing end of the tube 62 connects to a grease fitting 66. A resilient pad 68 (illustrated in FIGS. 7-9) attaches in overlying relation to the first edge 56 of the ring 54.

Figure 8:
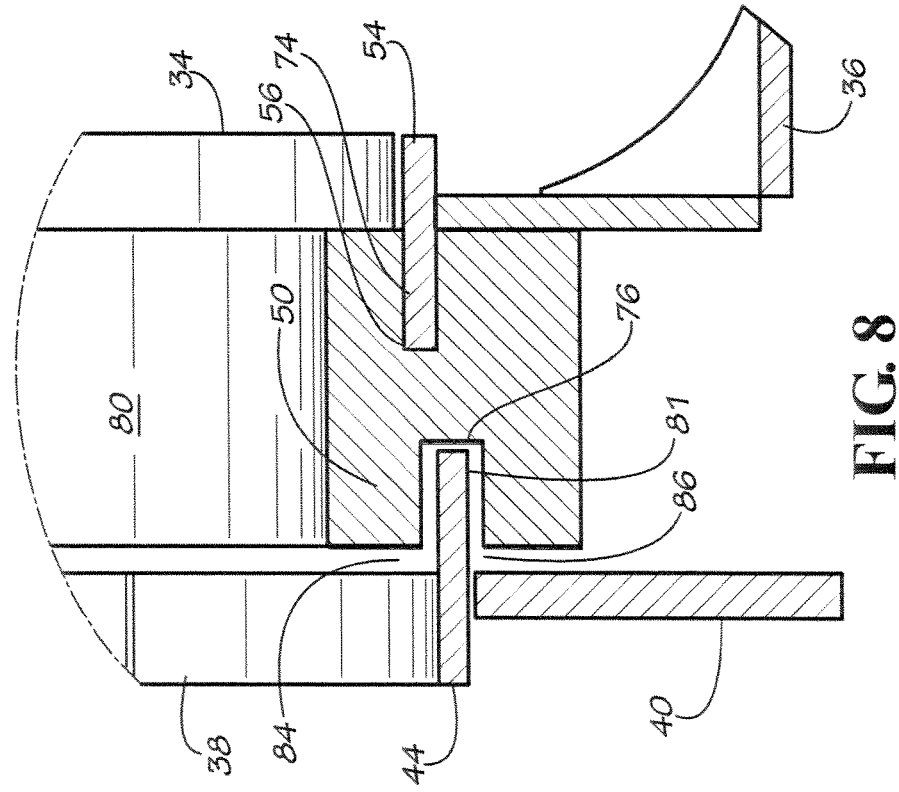
FIG. 8 illustrates in detailed cross-sectional view the axle connector assembly matingly receiving the axle hub assembly to define a grease galley for the purgeable labyrinth seal illustrated in FIG. 1.

With reference to FIG. 8, the resilient pad 50 in one embodiment comprises a circular ring having a slot 74 and an opposing channel 76. The pad 50 seats on the axle connector assembly 34 by the slot 74 receiving the ring 54 from the first edge 56. In an alternate exemplary embodiment, the resilient pad 68 comprises urethane molded in place. A mold with a urethane mixture, or alternatively, other suitable material, holds the connector assembly 34 while the urethane cures or solidifies to define the resilient member or pad 50 seated on and attached to the ring 54. The urethane flows around opposing sides and outer edge of the ring 54 and through the openings 55. The material cures and the material filling the openings 55 connects opposing portions thereof to help secure the urethane pad 50 to the ring 54.

Figure 7:
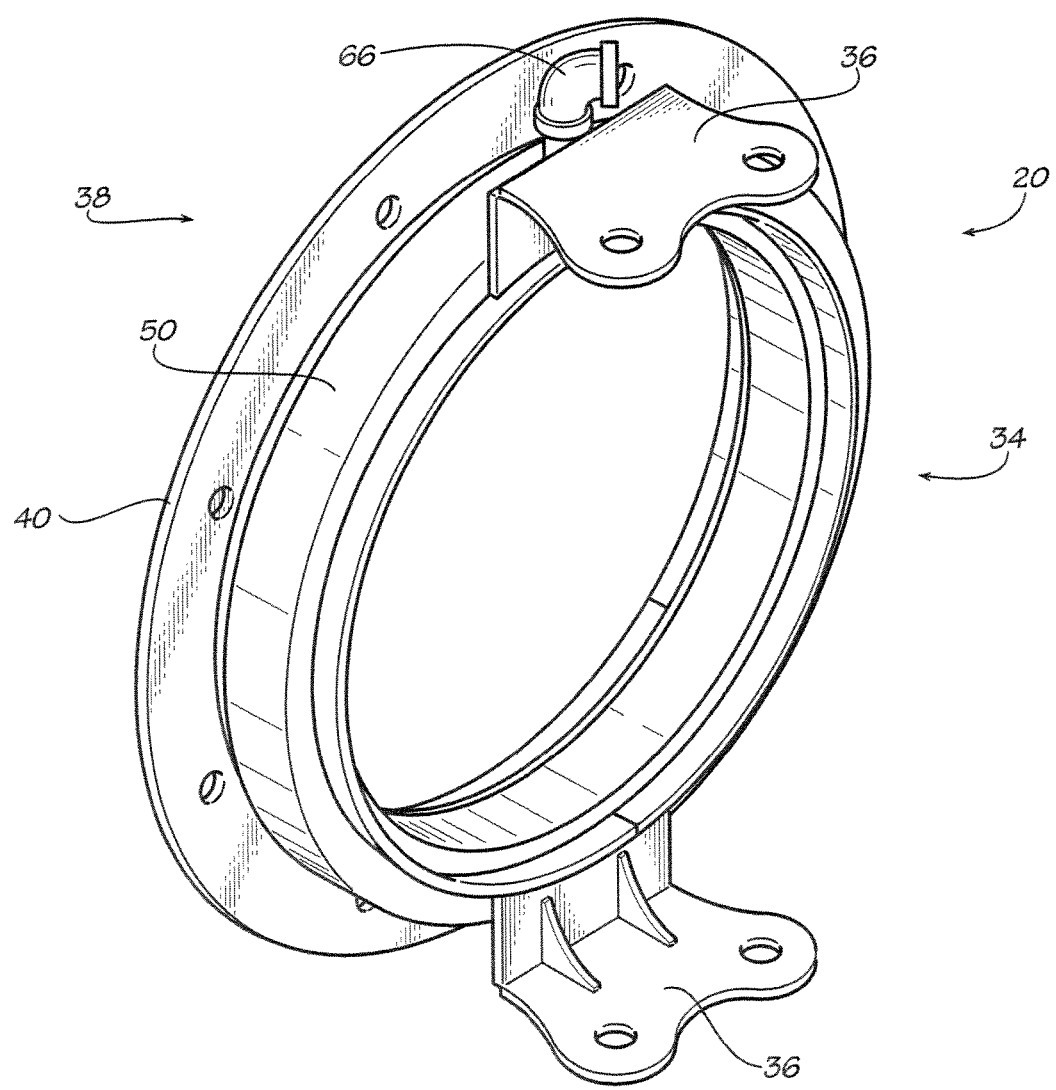
FIG. 7 illustrates in perspective view the front axle assembly for the purgeable labyrinth seal illustrated in FIG. 1, with the axle connector assembly matingly receiving the axle hub assembly.
Figure 9:
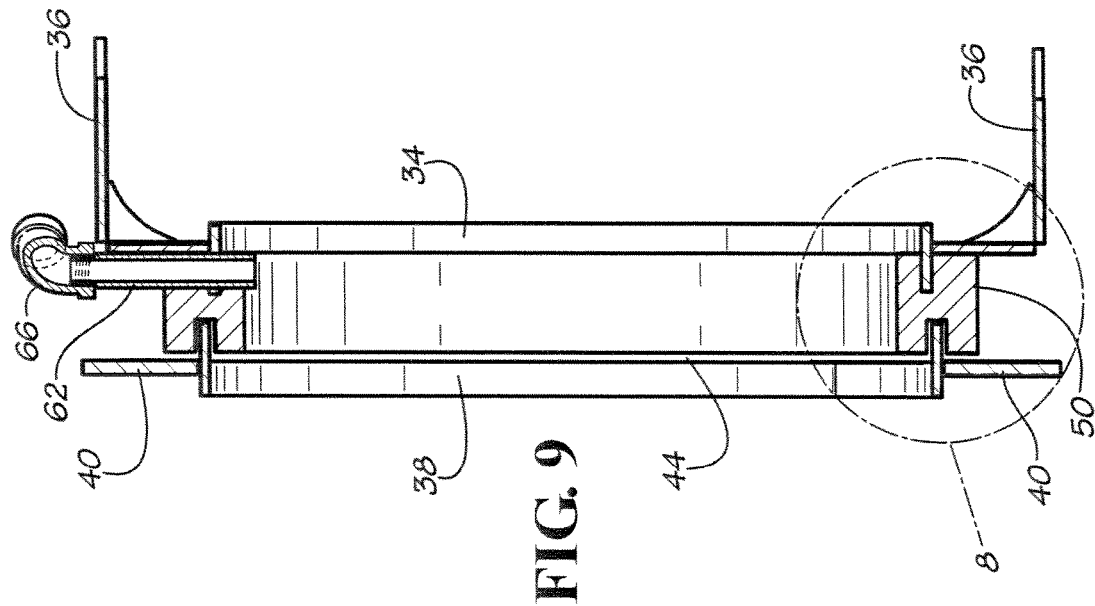
FIG. 9 illustrates in cross-sectional view the purgeable labyrinth seal illustrated in FIG. 7.

FIG. 7 illustrates in perspective view the purgeable labyrinth seal 20 illustrated in FIG. 1, with the steering axle connector assembly 34 matingly receiving the steering axle hub assembly 38. FIG. 9 illustrates the purgeable labyrinth seal 20 in cross-sectional view and FIG. 8 illustrates the axle connector assembly 34 matingly receiving the axle hub assembly 38 in detailed cross-sectional view. The channel 76 receives the leading edge 46 of the ring 44 when the connector assembly 34 and axle hub assembly are disposed in aligned opposing relation. The steering axle hub assembly 38 matingly engages the steering axle connector assembly 34 by the channel 76 of the pad 50 receiving the leading edge 46 of the ring 44. The axle connector assembly 34 and the hub assembly 38 define a grease galley 80 for a supply of grease filling the space around the joint of the steering axle 22 and the hub 24. The ring 44 and the pad 68 are held in close proximity. The ring 44 and the walls of the channel 76 in the resilient pad 68 thereby define a gap or labyrinth grease path 81 therebetween. The channel 76 has a first character and the ring 44 has a second character for cooperatively defining the labyrinth path 81. For example, in the exemplary embodiment, the channel 76 is urethane and the ring 44 is steel, thereby providing materials of different materials or properties to define the labyrinth path 81. An edge of the ring 44 and resilient pad 68 define an inlet opening 84 and a discharge opening 86 for the labyrinth grease path 81.

In an alternate embodiment, the ring 44 receives a resilient pad for cooperatively defining the labyrinth grease path 81. The pad comprises a circular ring that defines a slot to receive the leading edge 46 of the ring 44 for seating the pad on the ring. The resilient pad conforms in shape to the channel 76 of the pad 50 to define a second character received within the channel 76. The pad seats on the axle hub assembly 38 by the slot slidingly receiving the first edge 48 of the ring 44 and abutting against the face of the attaching plate 40. In an alternate embodiment, the pad is molded of urethane or other suitable material. In this alternate embodiment the ring 44 may define a plurality of openings (similar to the openings 55 in the ring 54) for receiving urethane and helping secure the molded urethane in place.

In the alternate embodiment, the similar materials of the opposing pads may experience galling or wear that arises from the relative motion of the pads due to a combination of friction and adhesion between the pad surfaces, followed by slipping and tearing of the material beneath the surface. Galling generally leaves some material stuck or even friction welded to the adjacent surface, while the galled material may appear gouged with balled-up or torn lumps of material stuck to its surface.

With reference to FIG. 9, the grease tube 62 extends through the ring 54. Grease from a supply communicates though the tube into the grease galley 80. The labyrinth path 81 defined by the closely spaced ring 44 and pad 68 is filled with grease and restricts entry into the space or grease galley 80 around the joint between the steering shoulder 28 and the hub 24.

Figure 10:
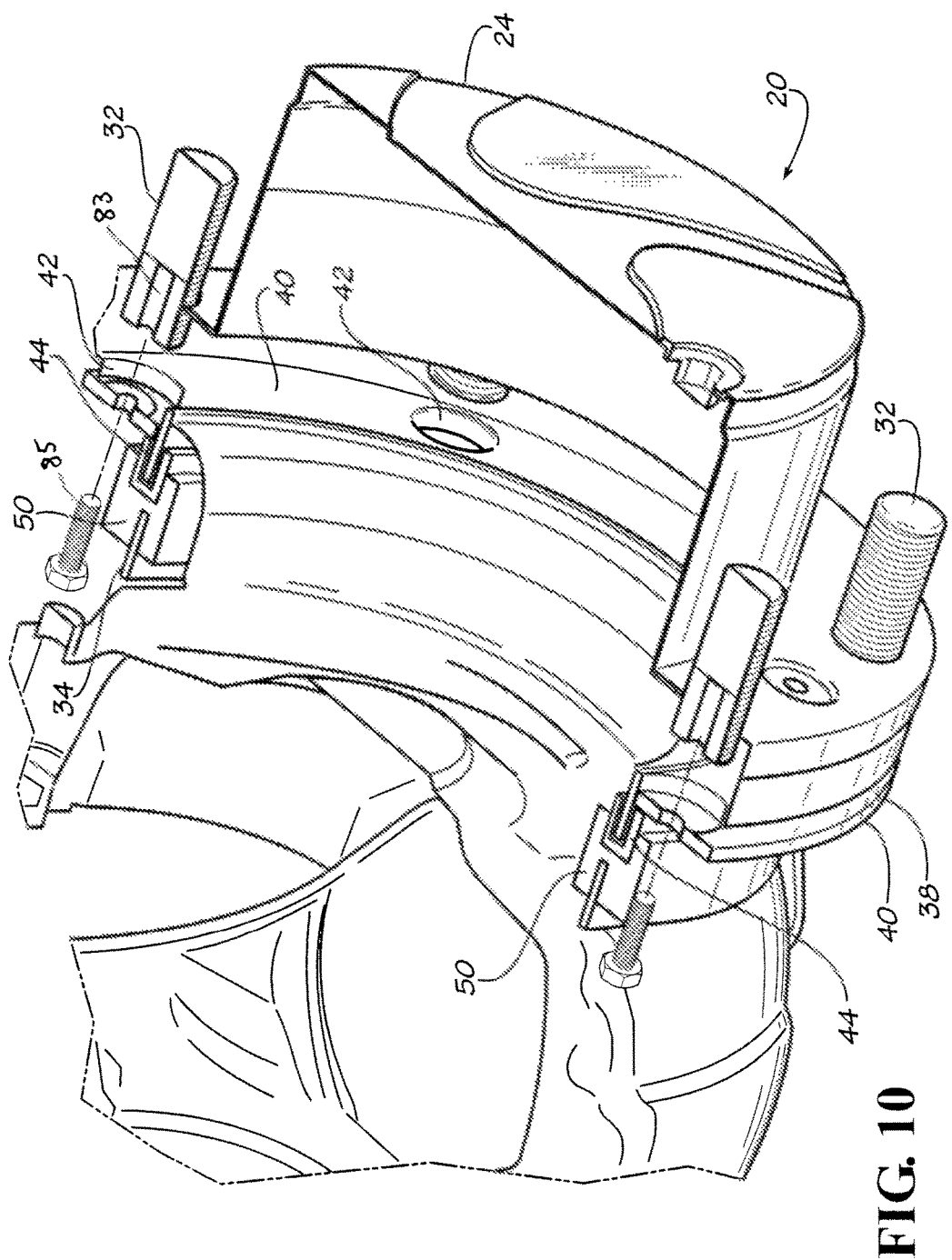
FIG. 10 illustrates in detailed cross-sectional view the purgeable labyrinth seal illustrated in FIG. 1 attached to a steering axle of a motor vehicle with the axle connector assembly matingly receiving the axle hub assembly to define the grease galley.

FIG. 10 illustrates in detailed cross-sectional view the purgeable labyrinth seal 20 illustrated in FIG. 1 attached to the steering axle 22 of the motor vehicle with the axle connector assembly 34 matingly receiving the axle hub assembly 38 to define the grease galley 80.

The axle connector assembly 34 attaches to the steering shoulders 28 of the steering axle 22. To do this, the hub 24 is removed. The nuts on the kingpins 26 are removed. The axle connector assembly 34 seats on the steering shoulders 28 by placing the flange plates 36 on the steering shoulder with the kingpins 26 extending through the openings 60. The nuts are replaced and tightened on the kingpins 26 to secure the axle connector assembly 34 to the steering axle 22.

The axle hub assembly 38 attaches to the hub 24 by tapping 83 the studs 32 from the axle side of the hub 24. The openings 42 in the attaching plate 40 of the axle hub assembly 38 align with the tapped studs 32. Threaded bolts 85 pass through respective openings 42 and each engages a respective one of the tapped studs 32. The hub 24 is reinstalled to the axle 22. The aligned ring 44 and resilient pad 68 are held in close proximity and define the labyrinth path 81 communicating with the grease galley 80. The labyrinth path 81 restricts flow of grease out of the space around the joint of the steering axle 22 and the hub 24 and restricts dirt, debris, water, and other contaminants from entry into the joint.

The grease galley 80 and labyrinth path 81 are periodically purged to eject or flush used grease and contaminants from the space around the joint of the axle 22 and the hub 24. During operational use of the motor vehicle equipped with the purgeable labyrinth axle/hub seal 20, centrifugal force pushes grease out through the labyrinth path 81 while the galley 80 provides a supply of grease to maintain the path 81 with grease. The grease gallery 80 is routinely and periodically re-charged with grease. The grease communicates from a supply though the grease tube 62 into the grease gallery.

Figure 11:
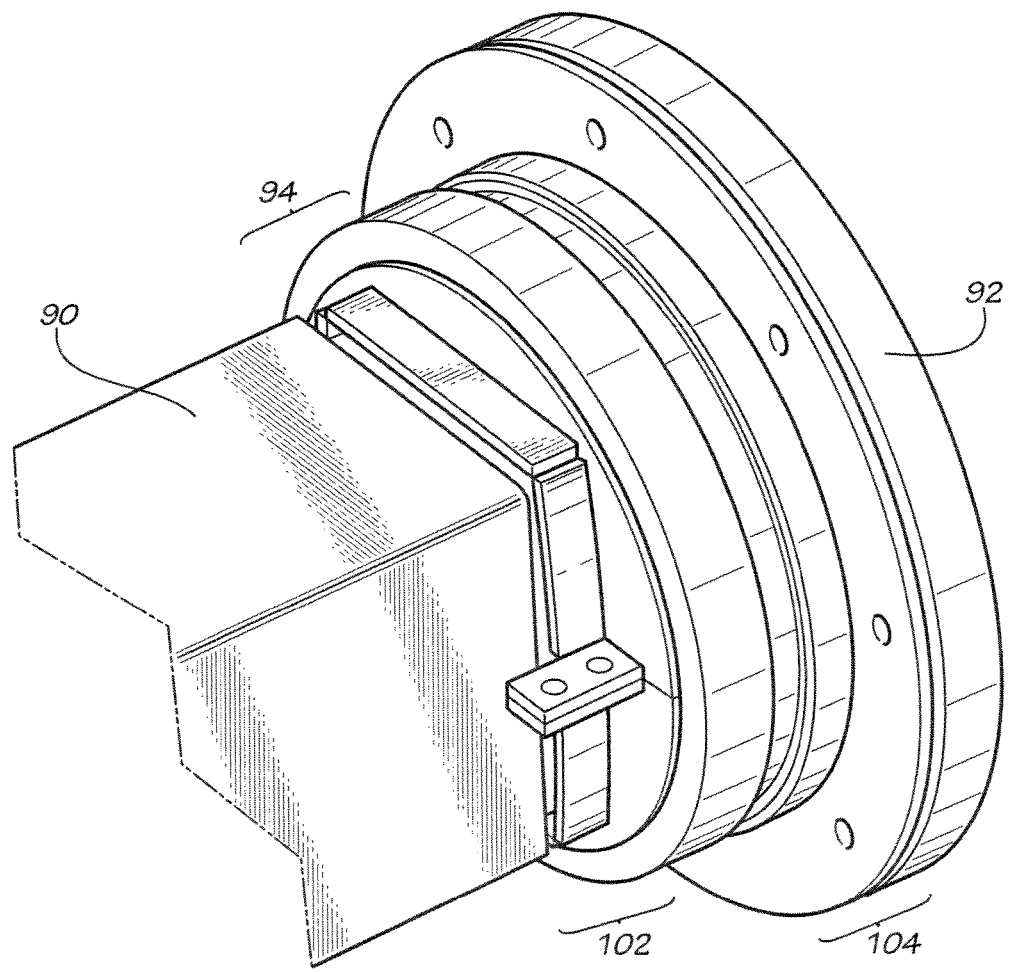
FIG. 11 illustrates in perspective view a fixed axle and hub having an embodiment of a purgeable labyrinth seal according to the present invention.

A second exemplary embodiment of the labyrinth seal according to the present invention is configured for enclosing the space around a joint of a fixed axle and hub. FIG. 11 illustrates in perspective view a fixed axle 90 and hub 92, such as a rear axle of a motor vehicle, having an embodiment of a purgeable labyrinth fixed axle seal 94 according to the present invention. The labyrinth seal 94 comprises an axle inner assembly 102 and a matingly received outer or hub assembly 104.

Figure 12:
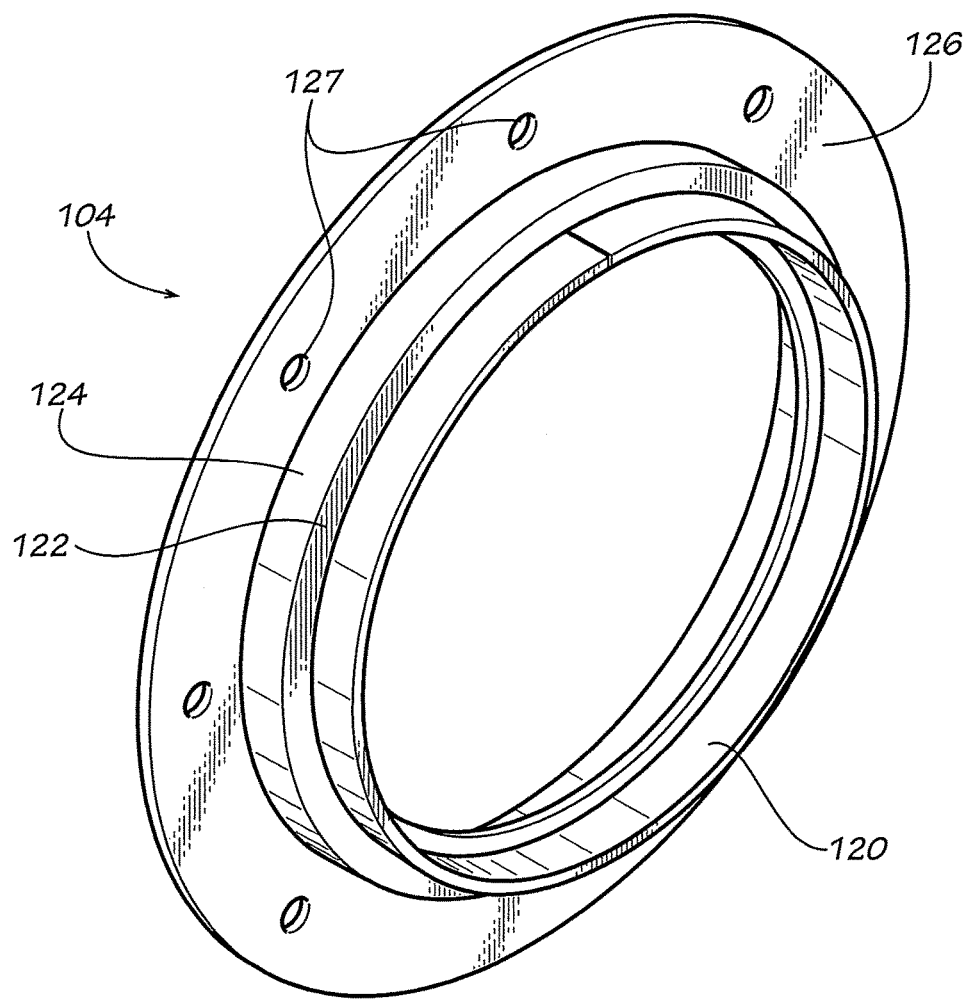
FIG. 12 illustrates a perspective view a hub assembly for the purgable labyrinth seal illustrated in FIG. 11.
Figure 13:
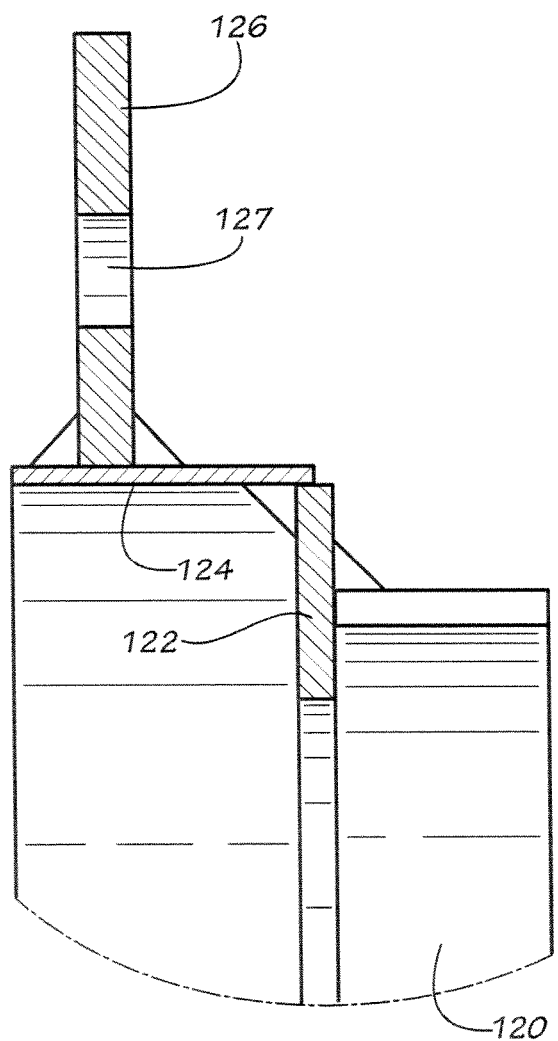
FIG. 13 illustrates a detailed cross-sectional view of the hub assembly shown in FIG. 12.
Figure 14:
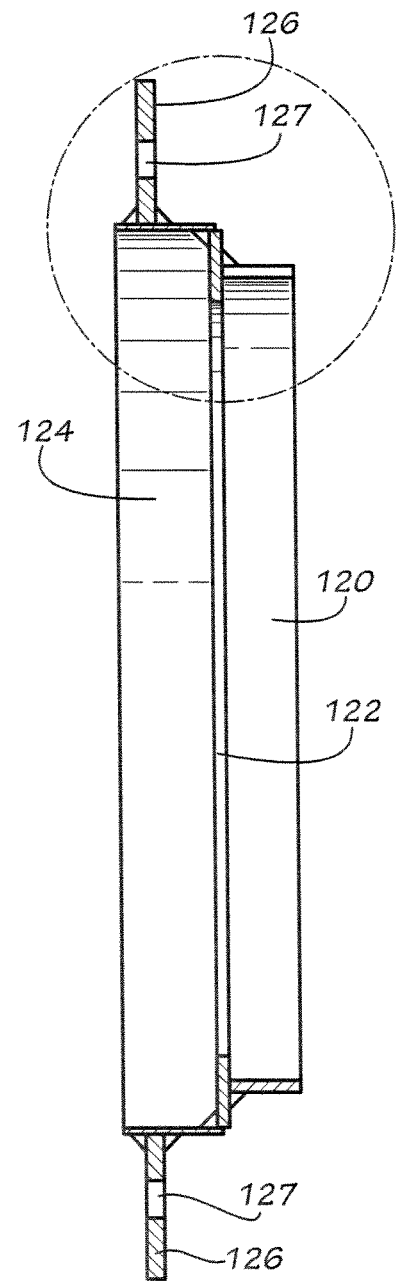
FIG. 14 illustrates a cross-sectional view of the hub assembly shown in FIG. 12.

FIG. 12 illustrates in perspective view the hub assembly 104 (also referred to as an axle outer assembly) for the purgable labyrinth seal 90. FIG. 13 illustrates the hub assembly 104 in a detailed cross-sectional view and FIG. 14 illustrates a cross-sectional view of the hub assembly. The hub assembly 104 comprises a cylindrical ring 120 and a disc plate 122 attached to an edge of the ring. A second cylindrical ring 124 attaches to an outer edge of the disc plate 122 coaxial with the ring 120. A mounting disc plate 126 attaches as a flange extending from an exterior surface of the ring 124. The mounting disc plate 126 attaches intermediate opposing edges of the ring 124. The mounting disc plate 126 defines a plurality of openings 127.

Figure 15:
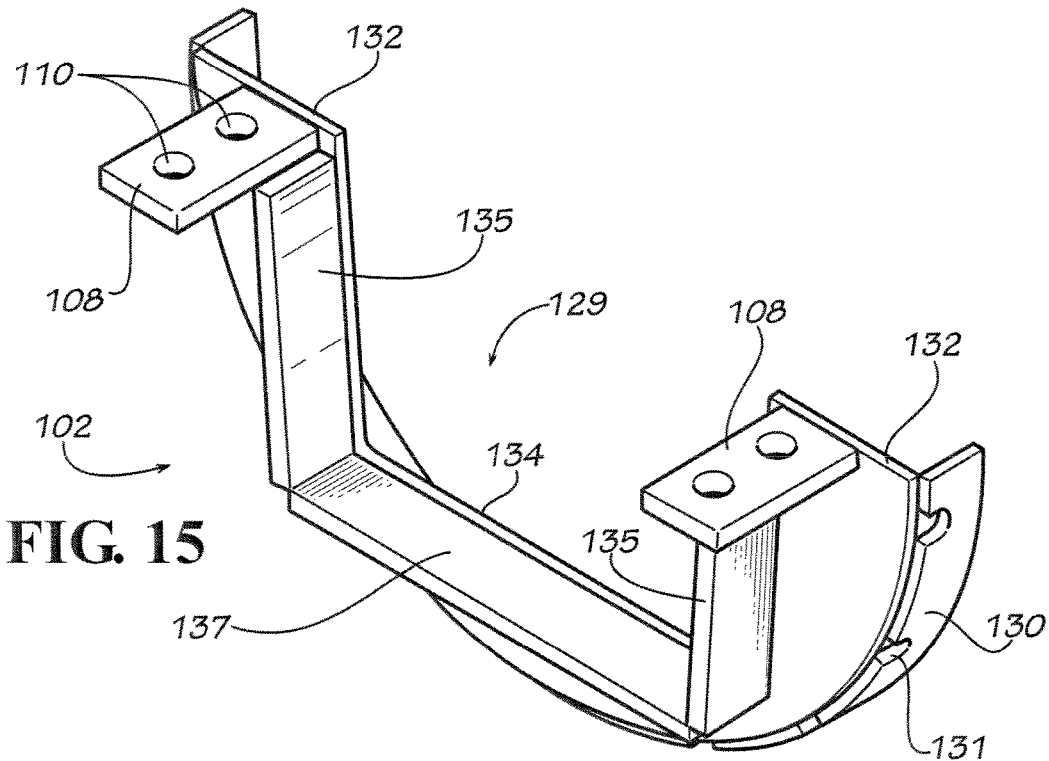
FIG. 15 is a perspective view of the fixed axle connector assembly for the purgable labyrinth seal illustrated in FIG. 11.
Figure 16:
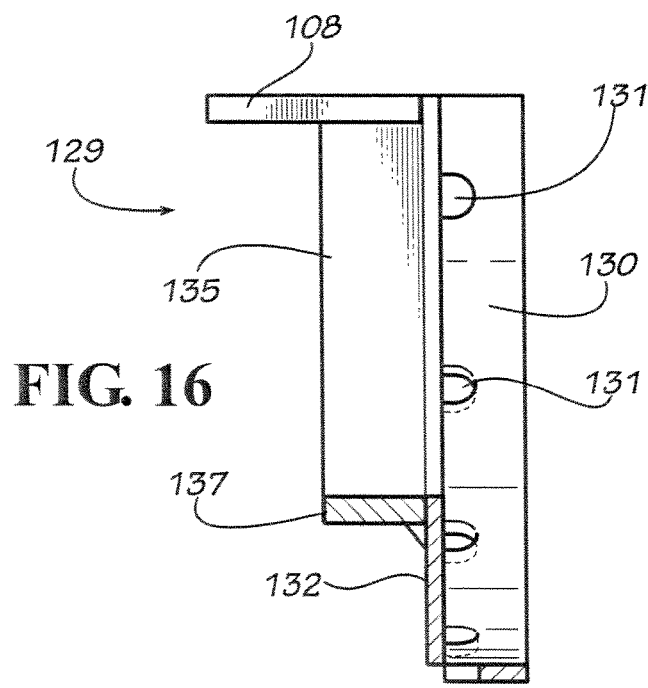
FIG. 16 illustrates in detailed cross-sectional view the fixed axle connector assembly shown in FIG. 15.

The fixed axle connector assembly 102 in the illustrated embodiment comprises a pair of mating upper and lower connector assemblies 129. FIG. 15 illustrates in perspective view one of the connector assembly 129. Two of the assemblies 129 are used for the purgable labyrinth seal 94. FIG. 16 illustrates the connector assembly 129 in detailed cross-sectional view. The connector assembly 129 comprises an insert wall 130 formed of a semi-circular portion of a cylinder. The insert wall 130 defines a plurality of openings 131. A plate 132 attaches to an edge of the insert wall 130. The plate 132 defines an inner edge 134 conforming in shape to the exterior of the axle. Two opposing side plates 135, 136, and a transverse plate 137 attach to the inner edge 134 and extend laterally. The connecting plates 108 attach to a free distal end of a respective one of the side plates 135, 136 and to the plate 132.

Figure 17:
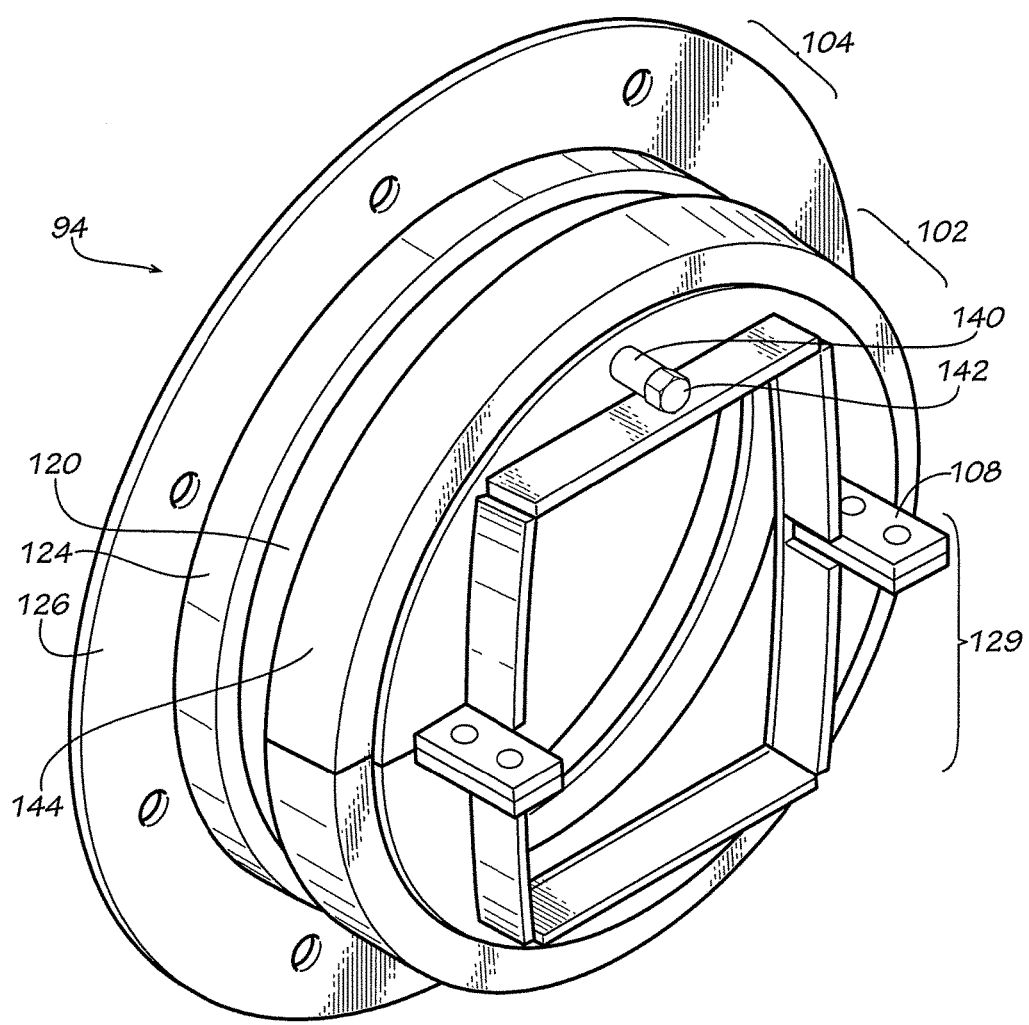
FIG. 17 illustrates in perspective view the purgeable labyrinth seal illustrated in FIG. 11, with the fixed axle connector assembly matingly receiving the hub assembly.
Figure 18:
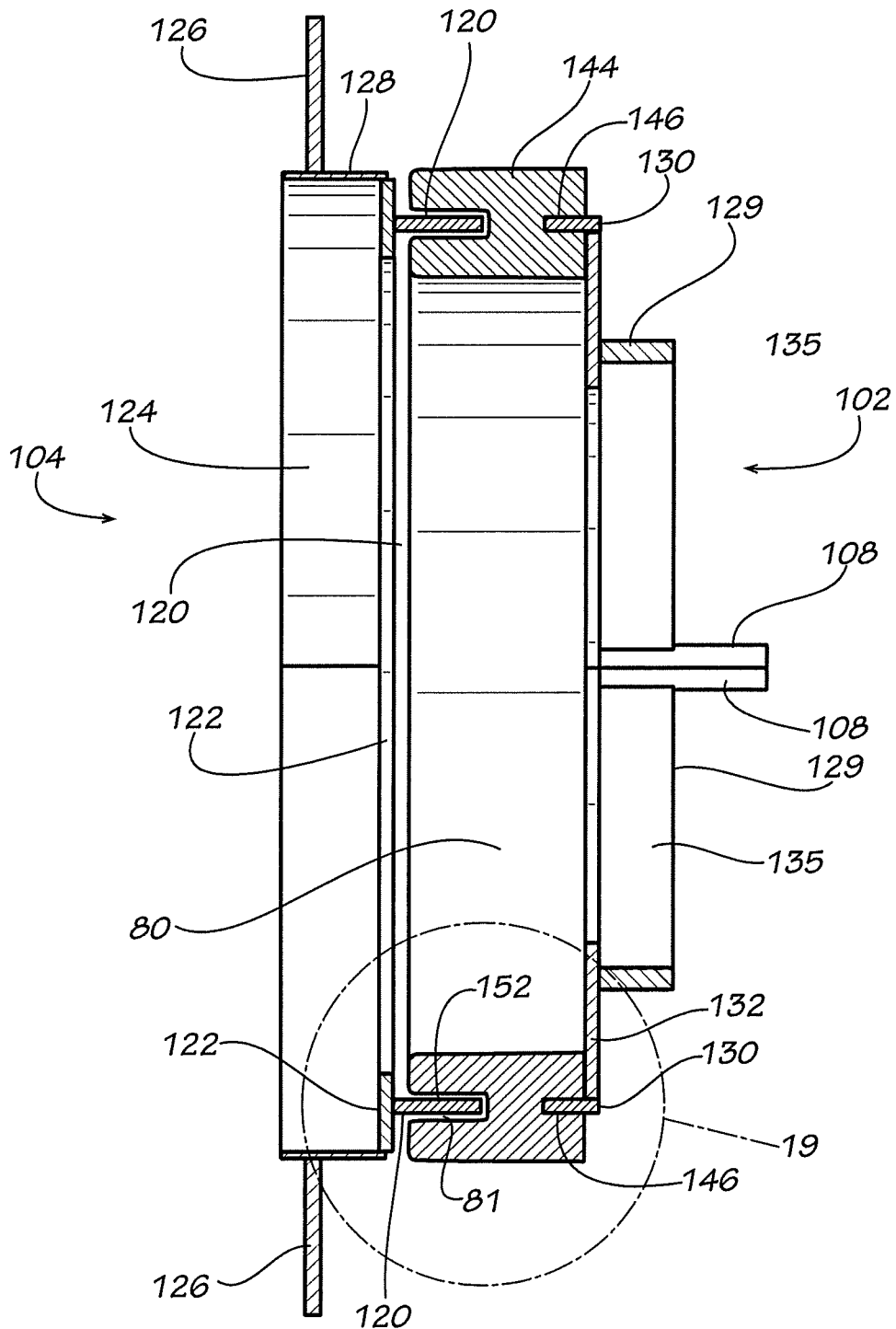
FIG. 18 illustrates in cross-sectional view the fixed axle connector assembly matingly receiving the axle hub assembly to define a grease galley for the purgeable labyrinth seal illustrated in FIG. 11.
Figure 19:
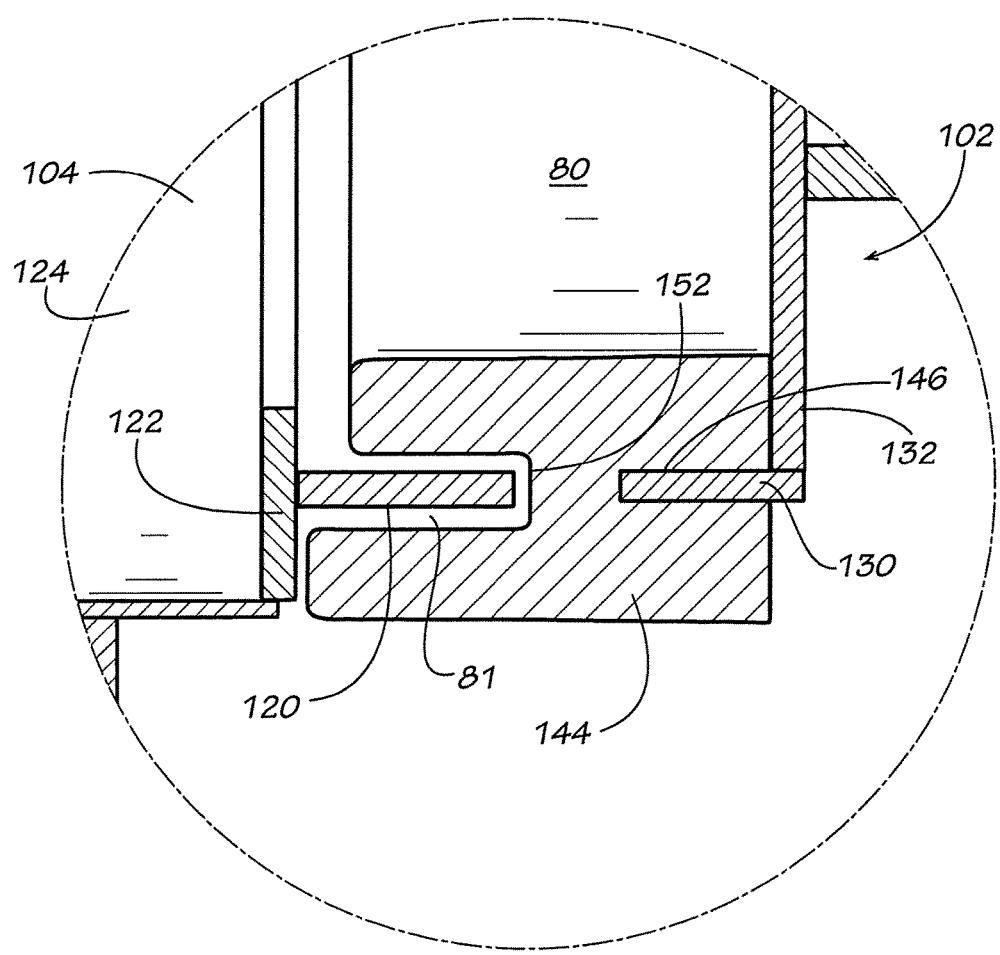
FIG. 19 illustrates in detailed cross-sectional view the grease galley shown in FIG. 18 for the purgeable labyrinth seal shown in FIG. 11.

FIG. 17 illustrates in perspective view the purgeable labyrinth seal 94 with the fixed axle connector assembly 102 matingly receiving the hub assembly 104. FIG. 18 illustrates in cross-sectional view the fixed axle connector assembly 102 matingly receiving the axle hub assembly 104 to define the grease galley 80 and labyrinth path 81 for the purgeable labyrinth seal 94. FIG. 19 illustrates in detailed cross-sectional view the grease galley 80 and labyrinth path 81.

As best illustrated in FIG. 17, a grease tube 140 attaches to one of the plates 132. The grease tube 140 extends through the plate 132 and terminates with an open end. An opposing end of the grease tube 140 connects to a grease fitting 142.

With reference to FIGS. 17-19, a resilient pad 144 attaches in overlying relation to the semi-circular insert wall 130. The pad 144 is a semi-circular member that defines a slot 146 for receiving the free distal edge of the insert wall 130. The pad 144 abuts the plate 132. The pad 144 defines a channel 152 opposing the slot 146. In an alternate exemplary embodiment, the resilient pad 144 comprises urethane molded in place. A mold with a urethane mixture, or alternatively, other suitable material, holds the connector assembly 129 while the urethane cures or solidifies to define the resilient member or pad seated on the wall 130. The urethane flows around opposing sides and outer edge of the wall and through the openings 131. The material cures and the material filling the openings connects opposing portions to help secure the urethane pad to the wall 130.

When installed, the connector assembly 102 matingly receives the hub assembly 104. The ring 120 and the resilient pad 144 are held in spaced-apart relation to define the labyrinth path 81 from the gallery 80. In an alternate embodiment, the ring 120 receives a resilient pad for cooperatively defining the grease path 81. The pad comprises a circular ring that defines a slot to receive the leading edge of the ring 120 of the hub assembly 104, for seating the pad on the ring. The resilient pad conforms in shape to the channel 152 of the pad 144. The pad seats on the hub assembly 104 by the slot 146 slidingly receiving the leading edge of the ring 120 and abutting against the face of the disc plate 122. In an alternate embodiment, the pad is molded of urethane or other suitable material. In this alternate embodiment the ring 120 may define a plurality of openings (similar to the openings 131 in the ring 130) for receiving urethane and helping secure the molded urethane in place.

In the alternate embodiment, the pads of similar materials may experience galling or wear that arises from the relative motion of the pads due to a combination of friction and adhesion between the pad surfaces, followed by slipping and tearing of the material beneath the surface. Galling generally leaves some material stuck or even friction welded to the adjacent surface, while the galled material may appear gouged with balled-up or torn lumps of material stuck to its surface.

Figure 20:
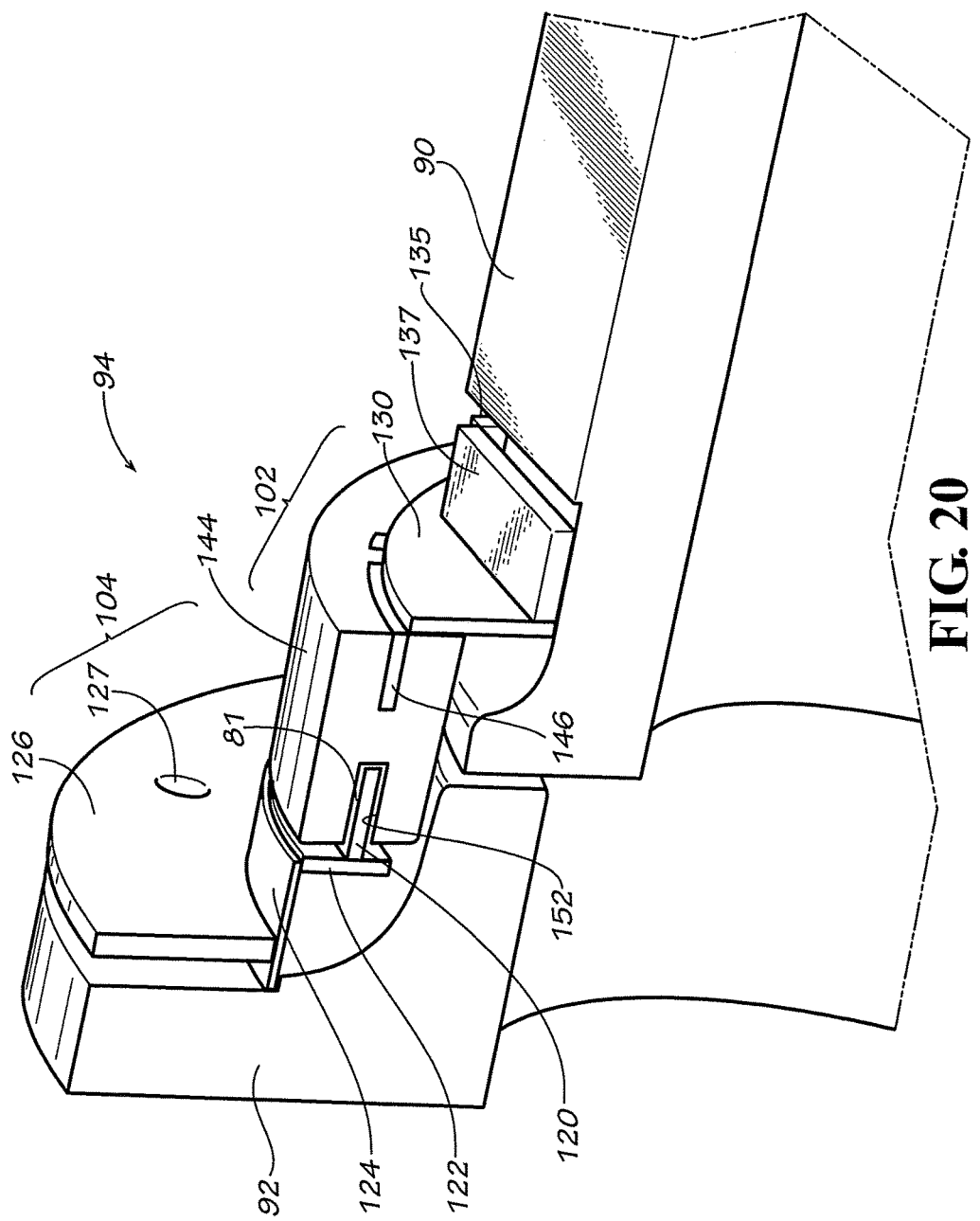
FIG. 20 illustrates in detailed cross-sectional view the purgeable labyrinth seal illustrated in FIG. 11 attached to a fixed axle of a motor vehicle with the fixed axle connector assembly matingly receiving the axle hub assembly to define the grease galley.

FIG. 20 illustrates in detailed cross-sectional view the purgeable labyrinth seal 94 attached to a fixed axle of a motor vehicle with the fixed axle connector assembly 102 matingly receiving the axle hub assembly 104 to define the grease galley 80 and path 81. With reference also to FIG. 15, two of the connector assemblies 129 are matingly attached around the axle 90. A first connector assembly 129 extends around a bottom surface and lower side portions of the axle housing and a second connector assembly 129 extends around a top surface and upper side portions of the axle housing. The connecting plates 108 align and bolts extend through the bores 110 to secure the connector assembly 104 to the axle 90.

The hub assembly 104 attaches to the hub 92 by tapping the studs 32 from the axle side of the hub. The openings 127 in the attaching plate 126 of the hub assembly 104 align with the tapped studs 32. Threaded bolts pass through respective openings 127 and engage a respective one of the tapped studs 32.

During operation of motor vehicle, the purgeable labyrinth seal 94 restricts dirt, water, mud, and other contaminates from entry into the space around the joint of the axle 90 and hub 92. The grease gallery 80 is filled with grease through the grease fitting 142. Periodically the grease is purged to eject or flush used grease and contaminants. Centrifugal force pushes grease out through the labyrinth path 81 while the gallery 80 provides a supply of grease to maintain the path 81 with grease. The grease gallery 80 is routinely and periodically recharged.

It is to be appreciated that the seal structure of the resilient pad 50 and ring 44 defining the grease path 81 may in an alternate embodiment be accomplished with a resilient pad disposed on the ring 44 of the hub assembly 38 rather than the ring 54, and with a channel that receives the ring 54 of the axle assembly 36. Similarly, the seal structure for the fixed axle may be accomplished with a resilient pad disposed on the ring 120 of the hub assembly 104 rather than the ring 130, and with a channel that receives the ring 130 of the axle connector 102.

The foregoing specification describes the purgable labyrinth axle/hub seal for motor vehicles. It is to be understood, however, that numerous changes and variations may be made in suspension structure within the spirit and scope of the present invention and that modifications and changes may be made therein without departing from the scope thereof as set forth in the appended claims.

What is claimed is:

1. A purgeable labyrinth axle/hub seal, comprising:
a first annular member and a second opposing annual member, the first annular member and the second annular member each comprising:
a ring having a first edge and a second edge; and
a flange disk attached to the ring and extending therefrom to a distal edge, the ring extending laterally from the flange disk;
means for attaching the first annular member to an end of an axle;
means for attaching the second annular member to a wheel hub attached to the axle in facing relation to the first annular member so that the opposing first and second annular members define a lubricant gallery therebetween;
a fitting for communicating a lubricant into the lubricant gallery; and
a seal member disposed between the first and second annular members and cooperatively defining a labyrinth path from the lubricant gallery,
whereupon lubricant communicates through the labyrinth path outwardly of the seal member during rotation of the first annular member relative to the second annular member.

2. The purgable labyrinth axle/hub seal as recited in claim 1, wherein a portion of the first annular member has a first character and a portion of the second annular member has a second character, which first and second characters cooperatively define the labyrinth path.

3. The purgable labyrinth axle/hub seal as recited in claim 2, wherein the seal member comprises a resilient pad received on the ring of the first annular member, the resilient pad defining a channel as the first character that receives the ring of the second annular member as the second character with a gap therebetween for defining the labyrinth path.

4. The purgable labyrinth axle/hub seal as recited in claim 3, wherein the resilient pad comprises urethane.

5. The purgable labyrinth axle/hub seal as recited in claim 2, wherein the fitting attaches to the first annular member.

6. The purgable labyrinth axle/hub seal as recited in claim 1, wherein the seal member comprises an annular ring that defines a groove on a first side for receiving the ring of the first annular member and a channel on an opposing side for receiving the ring of the second annular member.

7. The purgable labyrinth axle/hub seal as recited in claim 6, wherein the seal member comprises urethane.

8. The purgable labyrinth axle/hub seal as recited in claim 1, wherein the first annular member comprises a pair of U-shaped members, each U-shaped member having a cross bar for being disposed transverse to a longitudinal axis of the axle and a pair of legs extending in a first direction at respective opposing ends of the cross bar, each leg having a lateral flange that defines an opening, whereby the U-shaped members mount on opposing sides of the axle with the flanges aligned with a respective one of the flanges of the opposing member and for receiving a respective fastener through the aligned openings in the flanges to rigidly secure the U-shaped members axle mount to the axle.

9. The purgable labyrinth axle/hub seal as recited in claim 1, wherein
the wheel hub further comprises a hub plate and a plurality of threaded studs extending therefrom for attaching a wheel to the wheel hub, each stud defining a tapped bore through the hub plate; and
the flange disk of the second annular member defining a plurality of openings that align with the threaded studs of the hub plate; and
a plurality of threaded fasteners, each for extending through a respective one of the openings in the hub flange disk and engaging the aligned tapped bore,
whereby the second annular member rigidly attaches to the wheel hub.

10. A purgeable labyrinth axle/hub seal, comprising:
a first annular member having
a ring with a first edge and a second edge;
a flange disk attached to the first edge of the ring with the ring extending latterly from the flange disk; and
means for attaching the first annular member to an axle;
a second annular member having
a ring with a first edge and a second edge;
a flange disk attached to an outer surface of the ring intermediate the first edge and the second edge with the flange disk extending laterally therefrom; and
means for attaching the second annular member to a wheel hub attached to the axle with the respective second edges of the first annular member and the second annular member in facing relation;
a lubricant gallery defined thereby between the first annular member and the second annular member;
a fitting for communicating a lubricant into the lubricant gallery; and
a resilient pad disposed between the first and second annular members and cooperatively defining a labyrinth path,
whereupon lubricant communicates through the labyrinth path outwardly of the seal member during rotation of the second annular member relative to the first annular member.

11. The purgable labyrinth axle/hub seal as recited in claim 10, wherein the resilient pad defines a first channel of a first character that receives the ring of the first annular member and an opposing second channel of a second character that receives the ring of the second annular member.

12. The purgable labyrinth axle/hub seal as recited in claim 11, wherein the first character defines a gap between respective walls of the channel and the ring received therein for defining the labyrinth path.

13. The purgable labyrinth axle/hub seal as recited in claim 10, wherein means for attaching the first annular member comprises:
a pair of mounting members, each mounting member having a cross bar for being disposed transverse to a longitudinal axis of the axle and a pair of legs extending in a first direction at respective opposing ends of the cross bar, each leg having a lateral flange that defines an opening,
whereby the mounting members mount on opposing sides of the axle with the flanges aligned with a respective one of the flanges of the opposing mounting member and for receiving a respective fastener through the aligned openings in the flanges to rigidly secure the mounting members to the axle; and
means for securing the mounting members to the first annular member.

14. The purgable labyrinth axle/hub seal as recited in claim 13, wherein the first ring in the first annular member comprises a pair of semi-circular members and the flange disk in the first annular member comprises a pair of semi-circular plates, each semi-circular plate attached to a respective one of the semi-circular members, and each of the mounting members attached to a respective one of the semi-circular members.

15. The purgable labyrinth axle/hub seal as recited in claim 10, wherein the means for attaching the second annular member comprises a second ring attached to an outer edge of the flange disk and a second flange disk attached to an outer surface of the second ring intermediate opposing edges thereof and extending therefrom to a distal edge, the second flange disk defining a plurality of spaced-apart openings for receiving fasteners therethrough for attaching the second annular member to the wheel hub.

16. The purgable labyrinth axle/hub seal as recited in claim 15, wherein
the wheel hub further comprises a hub plate and a plurality of threaded studs extending therefrom for attaching a wheel to the wheel hub, each stud defining a tapped bore therein through the hub plate; and
the plurality of openings in the second flange disk aligning with the threaded studs of the hub plate; and
a plurality of threaded fasteners, each for extending through a respective one of the openings in the flange disk and engaging the respective aligned tapped bore,
whereby the second annual member rigidly attaches to the wheel hub.

17. The purgable labyrinth axle/hub seal as recited in claim 10, wherein the resilient pad comprises an annular ring that defines a groove on a first side for receiving the ring of the first annular member and a channel on an opposing side for receiving the ring of the second annular member.

18. The purgable labyrinth axle/hub seal as recited in claim 17, wherein the resilient pad comprises urethane.

19. The purgable labyrinth axle/hub seal as recited in claim 10, wherein the resilient pad comprises urethane.

20. The purgable labyrinth axle/hub seal as recited in claim 10, wherein the fitting attaches to the first annular member.

21. A purgeable labyrinth axle/hub seal, comprising:
a first annular member having
a ring with a first edge and a second edge;
a flange disk attached to the first edge of the ring with the ring extending latterly from the flange disk;
a pair of mounting members, each mounting member having a cross bar for being disposed transverse to a longitudinal axis of the axle and a pair of legs extending in a first direction at respective opposing ends of the cross bar, each leg having a lateral flange that defines an opening,
whereby the mounting members mount on opposing sides of the axle with the flanges aligned with a respective one of the flanges of the opposing mounting member and for receiving a respective fastener through the aligned openings in the flanges to rigidly secure the mounting members to the axle; and
at least one of the mounting members attached to the first annular member;
a second annular member having
a ring with a first edge and a second edge;

a flange disk attached to an outer surface of the ring intermediate the first edge and the second edge with the flange disk extending laterally therefrom; and a second ring attached to an outer edge of the flange disk and a second flange disk attached to an outer surface of the second ring intermediate opposing edges thereof and extending therefrom to a distal edge, the second flange disk defining a plurality of spaced-apart openings for receiving fasteners therethrough for attaching the second annular member to a wheel hub attached to the axle with the respective second edges of the first annular member and the second annular member in facing relation;

a lubricant gallery defined thereby between the first annular member and the second annular member;

a fitting for communicating a lubricant into the lubricant gallery; and a resilient pad disposed between the first and second annular members, the resilient pad defining a first channel that receives the ring of the first annular member and defines a gap between respective walls thereof and the ring for a labyrinth path, and an opposing second channel that receives the ring of the second annular member, whereupon lubricant communicates through the labyrinth path outwardly of the seal member during rotation of the second annular member relative to the first annular member.

22. The purgable labyrinth axle/hub seal as recited in claim 21, wherein the ring in the first annular member comprises a pair of semi-circular members and the flange disk in the first annular member comprises a pair of semi-circular plates, each semi-circular plate attached to a respective one of the semi-circular members, and each of the mounting members attached to a respective one of the semi-circular members.

23. The purgable labyrinth axle/hub seal as recited in claim 21, wherein the wheel hub further comprises a hub plate and a plurality of threaded studs extending therefrom for attaching a wheel to the wheel hub, each stud defining a tapped bore therein through the hub plate; and the plurality of openings in the second flange disk aligning with the threaded studs of the hub plate; and a plurality of threaded fasteners, each for extending through a respective one of the openings in the flange disk and engaging the respective aligned tapped bore, whereby the second annual member rigidly attaches to the wheel hub.

24. The purgable labyrinth axle/hub seal as recited in claim 21, wherein the resilient pad comprises urethane.

* * * * *

UNITED STATES PATENT AND TRADEMARK OFFICE
CERTIFICATE OF CORRECTION

PATENT NO. : 10,167,956 B2  
APPLICATION NO. : 15/201471  
DATED : January 1, 2019  
INVENTOR(S) : Frank Majerik Page 1 of 1

It is certified that error appears in the above-identified patent and that said Letters Patent is hereby corrected as shown below:

In the Claims

Column 8, Lines 13-14, change "a second opposing annual member" to --a second opposing annular member--.

Signed and Sealed this  
Twenty-fifth Day of June, 2019

Andrei Iancu  
*Director of the United States Patent and Trademark Office*